W. L. HERINGTON.
MACHINE FOR PULLING BEETS.
APPLICATION FILED FEB. 17, 1913.

1,098,350.

Patented May 26, 1914.

WITNESSES:
Geo. W. Fowle
Madge Buck

INVENTOR.
Walter Lee Herington
BY
Francis C. Huebner
ATTORNEY.

W. L. HERINGTON.
MACHINE FOR PULLING BEETS.
APPLICATION FILED FEB. 17, 1913.

1,098,350.

Patented May 26, 1914.
2 SHEETS—SHEET 2.

WITNESSES:
Geo. W. Fowle.
Madge Buck.

INVENTOR.
Walter Lee Herington
BY
Francis C. Huebner,
ATTORNEY.

UNITED STATES PATENT OFFICE.

WALTER LEE HERINGTON, OF FRESNO, CALIFORNIA.

MACHINE FOR PULLING BEETS.

1,098,350.  Specification of Letters Patent.  Patented May 26, 1914.

Application filed February 17, 1913. Serial No. 749,023.

*To all whom it may concern:*

Be it known that I, WALTER LEE HERINGTON, a citizen of the United States, and a resident of the city of Fresno, county of Fresno, and State of California, have invented a new and useful Machine for Pulling Beets, of which the following is a specification.

My invention relates to a machine which can be drawn over the ground and which will readily and easily pull the beets and carry them to a receptacle which is attached to the puller, without bruising or mutilating them.

Figure 1:
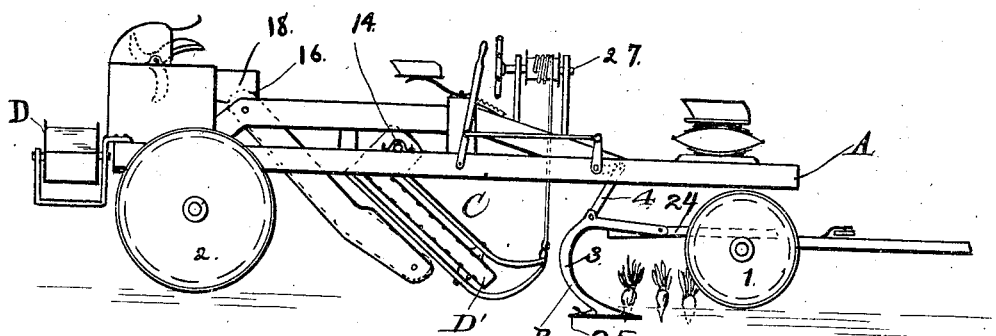
Figures 2, 3:
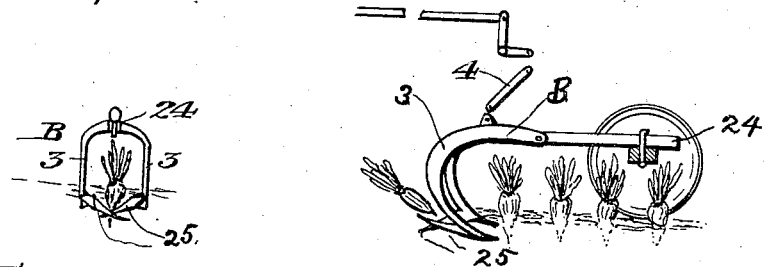
Figures 4, 5:
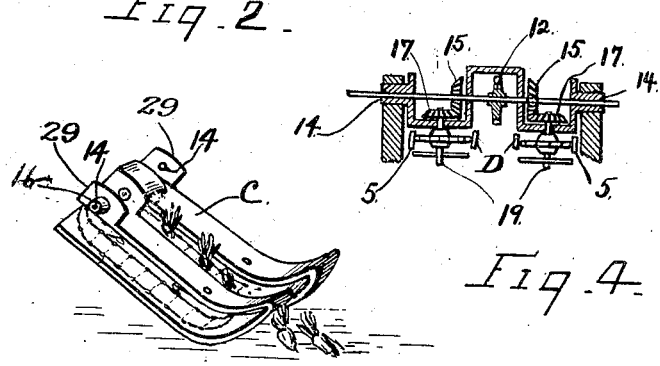
Figure 6:
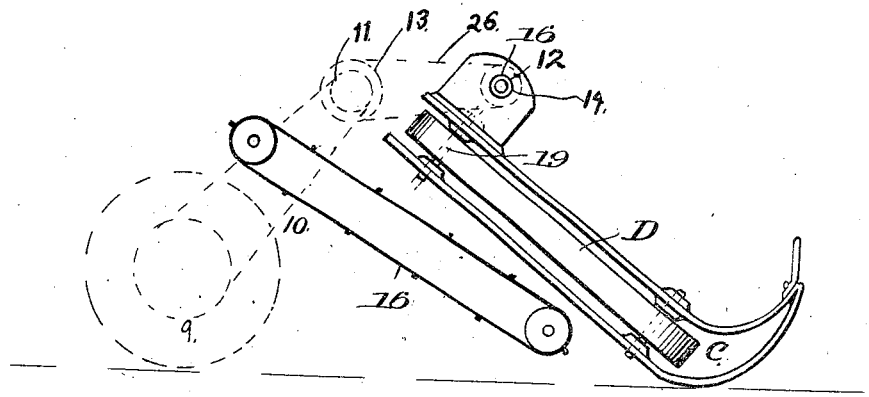
Figure 7:
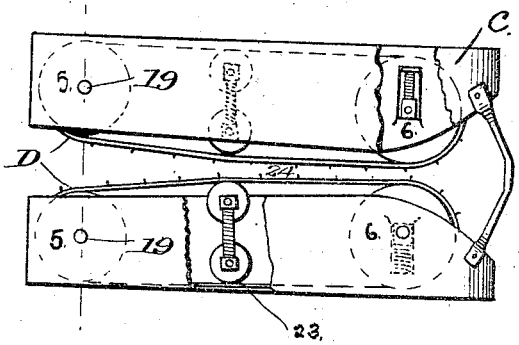
Figure 8:
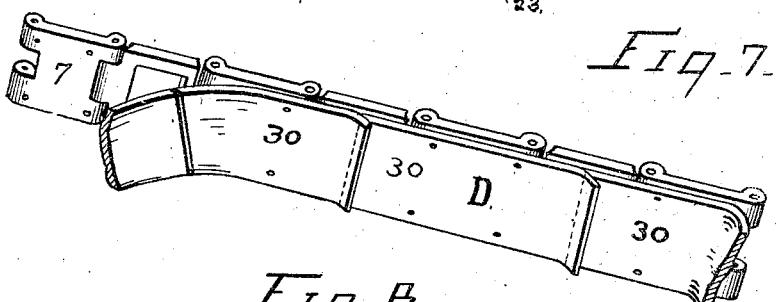

In the drawings which accompany this specification Figure 1 shows a perspective view of the machine complete. Fig. 2 shows the plow attached to the puller which is intended to loosen the soil on each side of the row of beets. Fig. 3 shows a front view of the portion of the plow illustrating the fins attached thereto which run under the beet and cut off the tap rods. Fig. 4 shows the mechanism which moves the parallel belts which pull the beet. Fig. 5 shows a perspective view of the support which carries said parallel belts. Fig. 6 is a side view of said support carrying the parallel belts. Fig. 7 is a bottom view of said support shown in Fig. 5, and Fig. 8 is a view of a section of said parallel belts.

In said drawings A is a platform mounted on a truck.

B is the plow by which I loosen the soil on each side of the row of beets. Plow B is constructed of twin curved standards 3 attached at the upper end to the plow beam 24 which is attached to the front axle of the truck. Twin standards 3 are tied together and are adjustable so they can be separated sufficiently for one shovel to pass on each side of the row of beets. The shovels on said plow are constructed with the half on the inside of the shovel cut flush with the standard, the object being to avoid bruising the beets when the plow is permitted to run closely thereto. At the extreme lower end of each of said shovels I have constructed a fin 25, which extends inwardly, and downwardly, its purpose being to run under the beet and cut off the tap and other roots which extend downward. At the top of standard 3 I have attached means for raising and lowering the plow when in use.

To the rear of the plow I have placed twin parallel belt supports C which are shaped like a sled runner, having an upward projection at the rear and at right angles to the said supports. These supports are hinged at the rear end thereof to the frame of the platform. Said belt support is constructed of such length that when the front end thereof is dropped to the ground the plane of the bottom of such supports is at an angle of approximately 45° with the ground. These supports C are swung so when driving the puller over the ground one of said supports runs on each side of the row of beets. In each of said supports I have a belt D which reaches from pulley 5 at one end thereof to pulley 6 at the other end. The faces of these belts are vertical and are on parallel planes with each other. I have preferred to construct such belts having a supporting chain 7 which is covered on one side by leather, rubber, or other pliable material as shown in Fig. 8. This covering is composed of short strips 30, fastened to each alternate link of the chain which strips slightly overlap. In my construction the chain runs next to the pulley and sustains the strain of the work, and the covering prevents the belt from bruising the beets when it rubs up against them.

For the purpose of moving belts D I have fastened an ordinary gear wheel 9 (shown in Fig. 6) to either of the rear wheels of the vehicle carrying the puller. Said wheel 9 carries motion when the puller is moved over the ground, by means of belt 10 which connects gear wheel 9 and pulley 11. Pulley 11 is attached to a shaft which rests in bearings on the frame A. Pulley 13 is attached to the same shaft as pulley 11, and carries a belt 26 which transmits power to pulley 12. Pulley 12 is attached to a shaft 14 which passes through bearings on the frame, and also through a projection on supports 29 and 29. Thus said shaft 14 acts as the hinge for the twin supports C, and said twin supports C can be raised or lowered at the front end thereof without changing the relation of pulley 12 to the pulleys 5 and the several gears shown in Fig. 4. On each side of pulley 12 and attached to said shaft 14 are two bevel cog wheels 15 which engage with bevel pinions 17, each of which is attached to shaft 19 which carries pulley 5. It will thus be seen that by the train of gears above set forth said twin belts on the inside of said supports work upward simultaneously and at equal speeds when the vehicle carrying the same moves forward. By dropping the point of supports C near the ground and driving the supporting vehicle so one of said supports C is on each side of the row of beets, the tops of the beets are grasped between the twin belts and as the puller is drawn forward the beet is lifted out of the ground and carried to a draper 16 which carries the beets to a platform 18.

In order to make the pressure between said twin belts uniform its entire length, I place idlers 23 and 24 between the two sides of each belt. There is a spring holding said idlers apart. For the purpose of raising and lowering belt supports C I have attached to frame A an ordinary hoist 27 which is connected to the front end of said belt supports C with a rope.

On the rear of platform 18 I have constructed a rotary knife having a plurality of blades, by means of which the tops of the beets can be cut off as they are thrown upon the platform 18, after which they can be dropped into a box D on the rear of said platform. Placing the beets under the knife and throwing them into the box is done by hand labor. Box D is balanced on so that at will it can be dumped on either side of the puller.

What I claim as my invention and upon what I desire Letters Patent are:

1. In a machine for pulling beets the combination of a vehicle, a supporting frame A, means for loosening the soil on each side of a row of beets, and beets pulling means consisting of twin supports extending from the rear of the means for loosening the soil at an angle upward and backward to frame A, and adapted to a vertical adjustment, pulleys on such supports carrying a belt on each support with the faces of such belts on parallel vertical planes, means for rotating such belts with the faces thereof nearest each other moving at a common rate of speed in an upward direction, and belts constructed with alternating open and solid flat links, with strips of pliable material attached to said solid links such strips being of sufficient size to cover the solid link and the open link adjoining and to slightly overlap the strip attached to the next solid link to the rear, all substantially as described.

2. In a machine for pulling beets the combination of a frame A carried on a vehicle, means for loosening the soil on each side of a row of beets, twin belt supports C suspended from said frame A, the front ends of which supports approach the ground at an angle thereto, and in front of the point where said supports are attached to frame A, twin belts operating lengthwise on said supports with the faces thereof nearest each other running in an upward direction on parallel planes, said belt being constructed of links covered on the outside with pliable material, means for transmitting power to such belt, all substantially as described.

3. In a machine for pulling beets the combination of a frame A carried on a vehicle, means for loosening the soil on each side of a row of beets, twin belt supports C suspended from said frame A, the front ends of which supports approach the ground at an angle thereto, and in front of the point where said supports are attached to frame A, twin belts operating lengthwise on said supports with the faces thereof nearest each other running in an upward direction on parallel planes, said belt being constructed of links covered on the outside with strips of pliable material which overlap the adjoining strip.

WALTER LEE HERINGTON.

Witnesses:
H. E. DWELLE,
MARIAN ALBERTSON.